(12) United States Patent
Grupido

(10) Patent No.: US 6,814,668 B2
(45) Date of Patent: Nov. 9, 2004

(54) UNIVERSAL JOINT WITH VENTING SEAL ASSEMBLY

(75) Inventor: Salvatore N. Grupido, Rochester, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 10/413,258

(22) Filed: Apr. 14, 2003

(65) Prior Publication Data

US 2004/0204249 A1 Oct. 14, 2004

(51) Int. Cl.⁷ ............................. F16D 3/41; F16J 15/32
(52) U.S. Cl. ..................... 464/133; 277/401; 277/402; 29/428
(58) Field of Search ............................. 464/11–14, 133, 464/131; 277/401, 402, 416, 562, 565; 29/898.07, 428

(56) References Cited

U.S. PATENT DOCUMENTS

| | | | |
|---|---|---|---|
| 4,154,490 A | 5/1979 | Kohler et al. | |
| 4,317,340 A | * 3/1982 | Krude et al. | 464/11 |
| 4,419,086 A | 12/1983 | Condon | |
| 4,611,932 A | 9/1986 | Olschewski et al. | |
| 4,943,262 A | * 7/1990 | Schultze | 464/131 |
| 5,407,387 A | 4/1995 | Mazziotti et al. | |
| 5,454,759 A | 10/1995 | Kretschmer et al. | |
| 6,162,126 A | 12/2000 | Barrett et al. | |
| 6,280,335 B1 | 8/2001 | Wehner et al. | |
| 6,357,757 B1 | 3/2002 | Hibbler et al. | |
| 6,406,187 B1 | 6/2002 | Lentini et al. | |
| 6,601,855 B1 | * 8/2003 | Clark | 277/549 |

* cited by examiner

*Primary Examiner*—David Bagnell
*Assistant Examiner*—K. Thompson
(74) *Attorney, Agent, or Firm*—Harness, Dickey & Pierce P.L.C.

(57) ABSTRACT

A universal joint includes a pair of bifurcated yokes interconnected by a cruciform. The cruciform includes four orthogonal trunnions each including a lubricant passage. A seal includes a plurality of protrusions engaging a portion of the trunnion to provide a purging path for trapped air.

21 Claims, 5 Drawing Sheets

US 6,814,668 B2

UNIVERSAL JOINT WITH VENTING SEAL ASSEMBLY

BACKGROUND OF THE INVENTION

The present invention generally relates to a universal joint for use in a driveline of a motor vehicle. More specifically, the present invention pertains to a universal joint equipped with a mechanism for securing a bearing cup assembly to a cruciform trunnion.

As is commonly known, universal joints are used in motor vehicle driveline applications for interconnecting a pair of rotary shafts and permitting changes in angularity therebetween. Many conventional universal joints include a pair of bifurcated yokes which are secured to the rotary shafts. The bifurcated yokes are interconnected by a spider or a cruciform for rotation about independent axes. The cruciform includes four orthogonal trunnions with each opposing pair of axially aligned trunnions mounted in a pair of aligned bores formed in the bifurcated yokes. Typically, a bearing cup is secured in each bore and a bearing assembly is retained in the bearing cup such that each yoke is supported for pivotal movement relative to one of the pairs of trunnions. In addition, it is known to use a thrust washer between the trunnion and the bearing cup to absorb the radially-directed thrust forces which may occur therebetween.

During assembly of the universal joint, difficulties may arise when attempting to couple the bearing assemblies to the cruciform. Typically, each bearing assembly includes a seal coupled to a bearing cup which engages a portion of the trunnion. During the assembly process, air and grease are sometimes trapped within the bearing cup. The pressure can cause the bearing assembly to be misaligned or to become improperly positioned after the installation force is removed. Possible bearing contamination and loss of productivity may result. In some instances, the bearing cup assemblies must be removed and re-installed requiring expense of time and cost. Accordingly, it would be advantageous to provide a universal joint having bearing cup assemblies which allow trapped air and grease to be purged during installation without compromising the integrity of the bearing cup to trunnion seal.

SUMMARY OF THE INVENTION

The present invention is directed to a universal joint for interconnecting a pair of rotating shafts. The universal joint includes a pair of bifurcated yokes interconnected by a cruciform. The cruciform includes four orthogonal trunnions each including a lubricant passage. A seal includes a plurality of protrusions engaging a portion of the trunnion to provide a purging path for trapped air.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

In general, the present invention is directed to a universal joint of the type used in motor vehicle driveline applications for interconnecting rotating shafts in a manner permitting changes in angularity therebetween.

Figure 1:
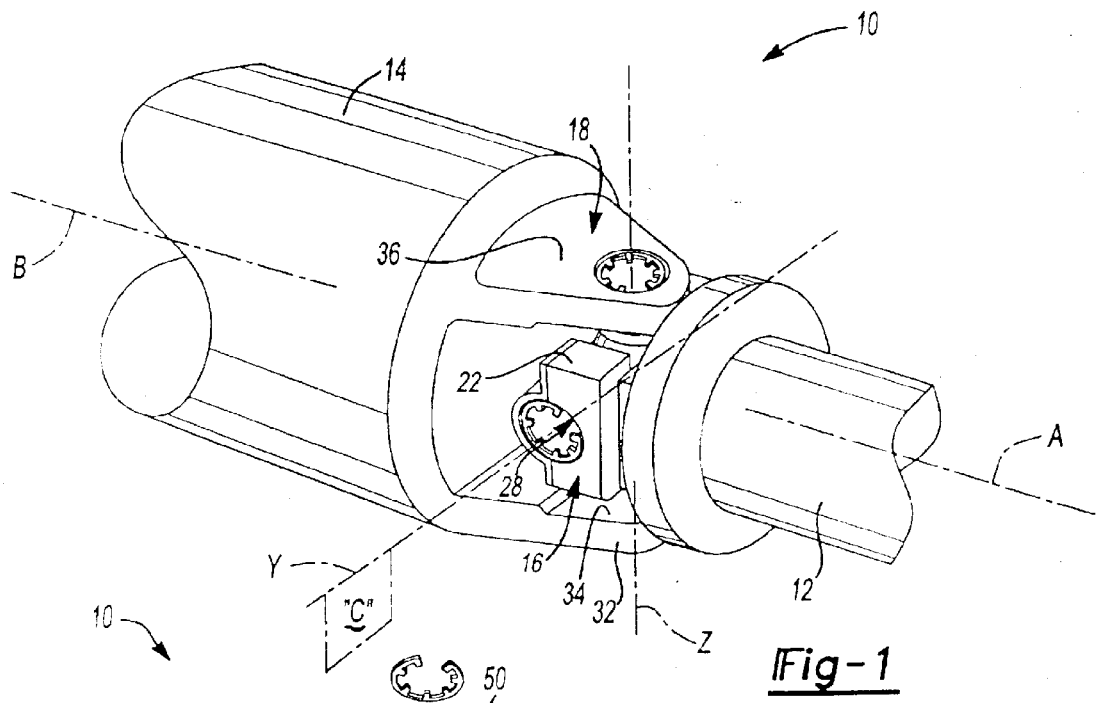
FIG. 1 is a perspective view of a universal joint according to the principals of the present invention.
Figure 2:
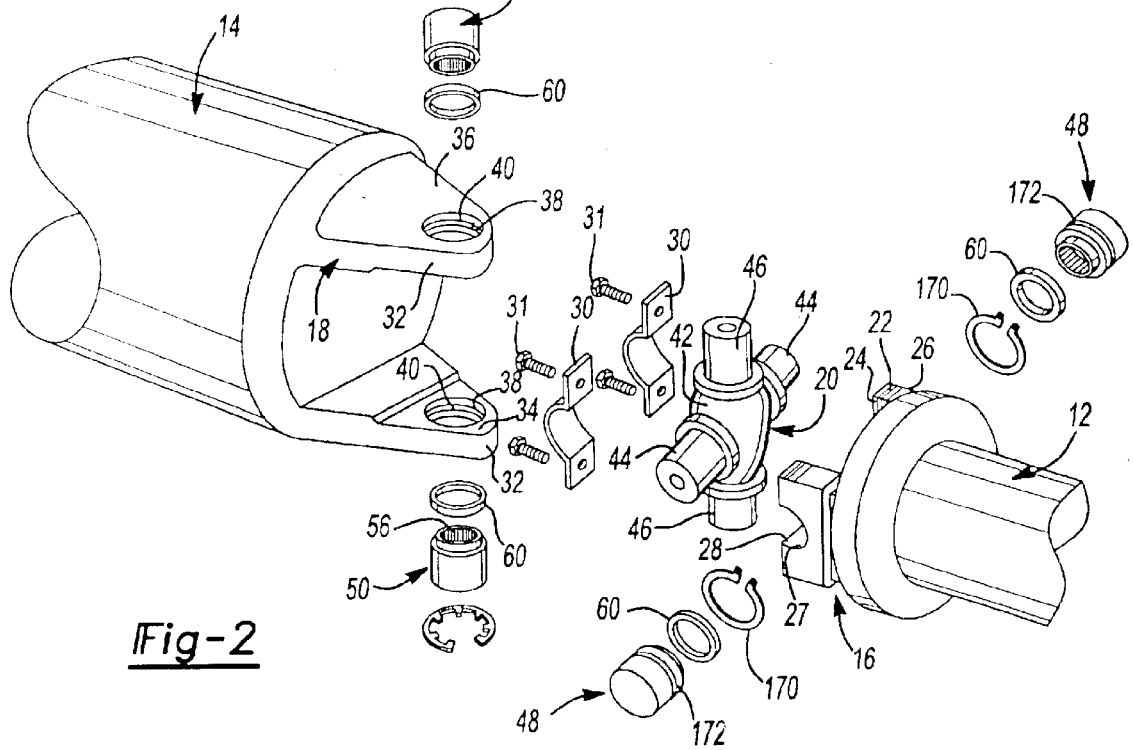
FIG. 2 is an exploded perspective view of the universal joint shown in FIG. 1.

Referring to FIGS. 1 and 2, a universal joint 10 is shown connecting a first shaft 12 to a second shaft 14. In general, universal joint 10 includes a first yoke 16 attached to an end of first shaft 12, a second yoke 18 attached to an end of second shaft 14 and a cruciform 20 interconnecting first yoke 16 to second yoke 18. The first yoke 16 is bifurcated and includes a pair of laterally-spaced legs 22 which are preferably symmetrical with respect to the rotary axis of first shaft 12, as denoted by construction line "A". Legs 22 include an inboard surface 24 and an outboard surface 26 with a journal 27 extending therebetween. Apertures 28 are formed by coupling a pair of end caps 30 to legs 22 via fasteners 31. End caps 30 cooperate with journals 27 to complete apertures 28. Apertures 28 are aligned on a first trunnion axis, as denoted by construction line "Y", which passes through and is orthogonal with respect to rotary axis "A" of first shaft 12.

Second yoke 18 is bifurcated and includes a pair of laterally-spaced legs 32 which are preferably symmetrical with respect to the rotary axis of second shaft 14, as denoted by construction line "B". Legs 32 include an inboard surface 34 and an outboard surface 36 with an aperture 38 extending therebetween. Apertures 38 are aligned on a second trunnion axis, as denoted by construction line "Z", which passes through and is orthogonal with respect to rotary axis "B" of second shaft 14. Apertures 38 are throughbores which include an annular groove 40 formed between the inboard surface 34 and the outboard surface 36. It should be noted that the shape and dimensions of apertures 28 and 38 may either be identical or different depending on the particular dimensions of cruciform 20 used therewith. It should also be noted that the annular ring groove 40 may be formed by machining, casting or by similar technique.

As best seen in FIG. 2, cruciform 20 includes a central hub 42 from which a pair of first trunnions 44 and a pair of second trunnions 46 extend. First trunnions 44 are orthogonal with respect to second trunnions 46. First trunnions 44 are adapted for insertion into apertures 28 in legs 22 of first yoke 16 so as to be axially aligned on first trunnion axis "Y". Similarly, second trunnions 46 are adapted to be inserted into apertures 38 in legs 32 of second yoke 18 so as to be axially aligned on second trunnion axis "Z". With first trunnions 44 and second trunnions 46 installed in first and second yokes 16 and 18, respectfully, trunnion axes "Y" and "Z" pass through a common plane "C" which orthogonally intersects the rotary axis of cruciform 20, as shown in FIG. 1.

Universal joint 10 also includes a first pair of bearing cup assemblies 48 adapted to be mounted in apertures 28 and a second pair of bearing cup assemblies 50 adapted to be mounted in apertures 38. First bearing cup assemblies 48 are provided for receiving and rotatably supporting first trunnions 44 in apertures 28. Similarly, second bearing cup assemblies 50 are provided for receiving and rotatably supporting second trunnions 46 in apertures 38. For purposes of brevity, the following description will be limited to the components of first bearing cup assemblies 48 with the understanding that the corresponding components of second bearing cup assemblies 50 are substantially identical.

Figure 3:
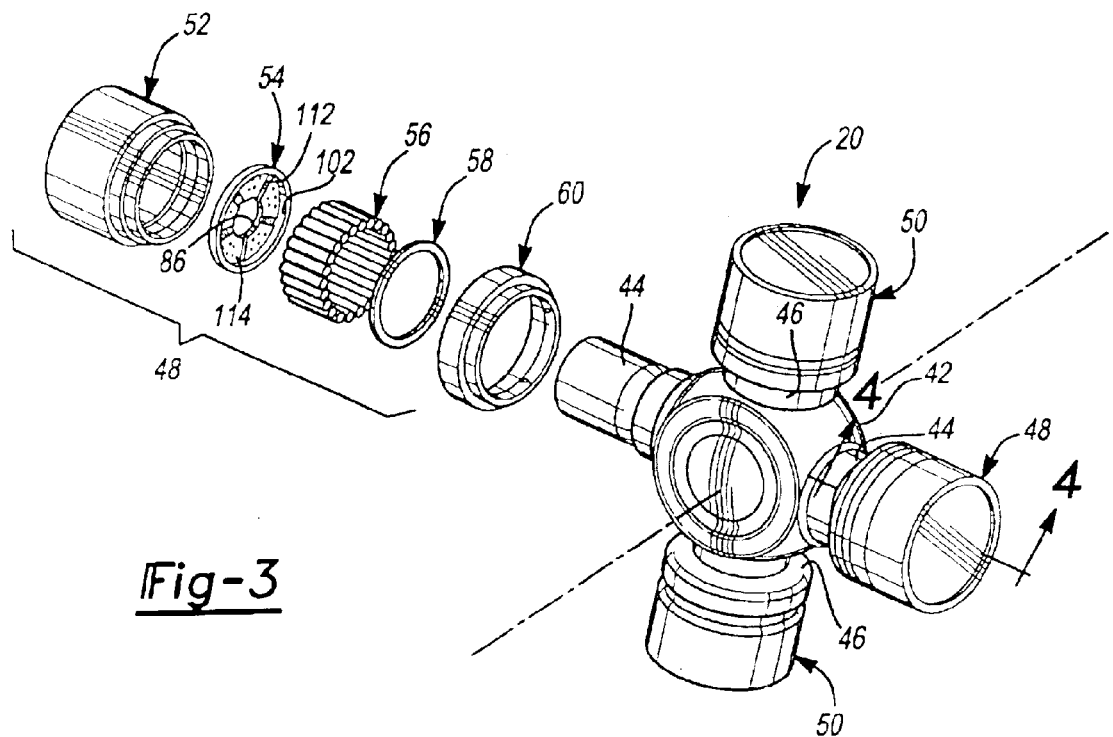
FIG. 3 is a partial exploded perspective view of a trunnion and bearing cup assembly of the present invention.
Figure 4:
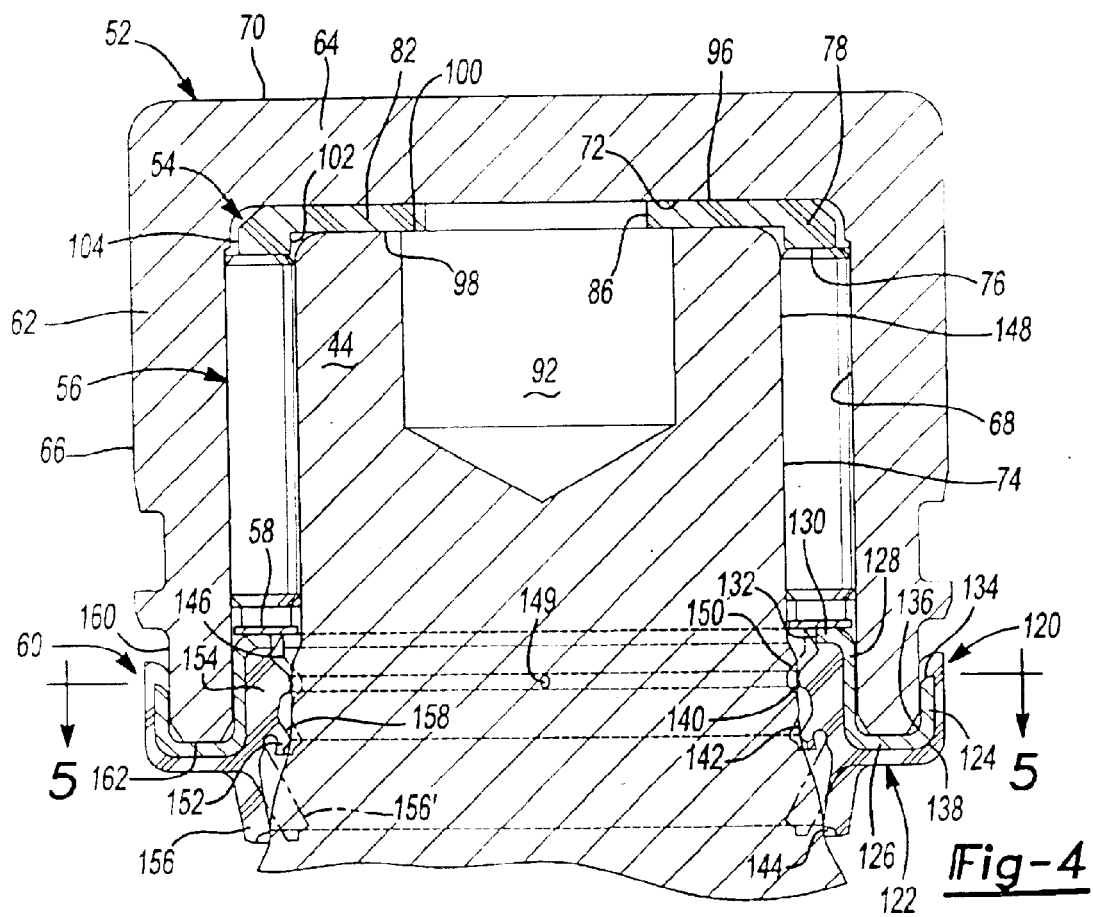
FIG. 4 is a partial cross-sectional side view of a universal joint including a seal constructed in accordance with the teachings of the present invention.

FIGS. 3 and 4 depict each bearing cup assembly 48 as including a bearing cup 52, a thrust washer 54, roller bearings 56, a seal washer 58 and an elastomeric seal 60. Bearing cup 52 is substantially hollow and cylindrical in shape. Bearing cup 52 includes a substantially cylindrical tubular segment 62 closed at one end by an end segment 64. Tubular segment 62 includes an outer wall surface 66 and an inner wall surface 68. End segment 64 includes an outer surface 70 and an inner surface 72. Roller bearings 56 are positioned between inner wall surface 68 and an outer wall surface 74 of trunnion 44 to allow relative rotary movement between bearing cup 52 and trunnion 44. Roller bearings 56 are oriented to rotate on an axis parallel to axis "Y" of trunnions 44 and are arranged in a circumferential array about this axis. One end of each roller bearing 56 is supported to roll against the bearing surface 76 formed on a circumferential flange segment 78 of thrust washer 54. The opposite ends of roller bearings 56 are captured by seal washer 58 which, in turn, is retained by seal 60. Seal 60 extends between outer wall surface 66 of bearing cup 52 and outer wall surface 74 of trunnion 44 to protect roller bearings 56 from contamination and to retain lubricant within bearing cup assembly 48.

As best shown in FIGS. 3 and 4, thrust washer 54 includes a disk segment 82 from which circumferential flange 78 extends. A central aperture 86 extends through disk segment 82 and is in communication with a lubricant passage 92 found in each trunnion. A fitting (not shown) mounted on central hub 42 of cruciform 20 communicates with lubricant passage 92. The fitting is used to supply lubricant to passage 92 for lubricating roller bearings 56 as well as for providing a lubricant film between relatively moveable surfaces.

Disk segment 82 has an outer face surface 96 which faces and contacts inner surface 72 of bearing cup 52. Disk segment 82 also includes an inner face surface 98 which faces and contacts an end surface 100 of trunnion 44. Inner face surface 98 and outer face surface 96 are substantially parallel such that disk segment 82 has a constant thickness. In addition, thrust washer 54 includes a circumferential inner wall surface 102 and a circumferential outer wall surface 104, as defined by flange segment 78. Circumferential inner wall surface 102 is adapted to face outer wall surface 74 of trunnion 44. Circumferential outer wall surface 104 faces inner wall surface 68 of bearing cup 52. As such, thrust washer 54 functions to align bearing cup 52 and trunnion 44.

Thrust washer 54 includes a series of lubrication grooves 112 which extend radially from central aperture 86 to circumferential inner wall surface 102 of flange segment 78. Grooves 112 are arcuate in profile to define a cylindrical wall surface it is preferable that an odd number of grooves 112 are provided and which are equally spaced to define a like number of pie-shaped portions of disk segment 82. In addition, a plurality of indentations or dimples 114 are formed on the pie-shaped portions of disk segment 82. Dimples 114 can be randomly oriented or, more preferably, be aligned to define two circumferential rows. Dimples 114 are adapted to retain lubricant therein to provide continuous lubrication over a large area of trunnion end surface 100. In addition, dimples 114 allow contaminants to be removed from the operating surfaces and be collected therein. Thrust washer 54 is constructed from a resilient material such as injection molded plastic.

Figure 5:
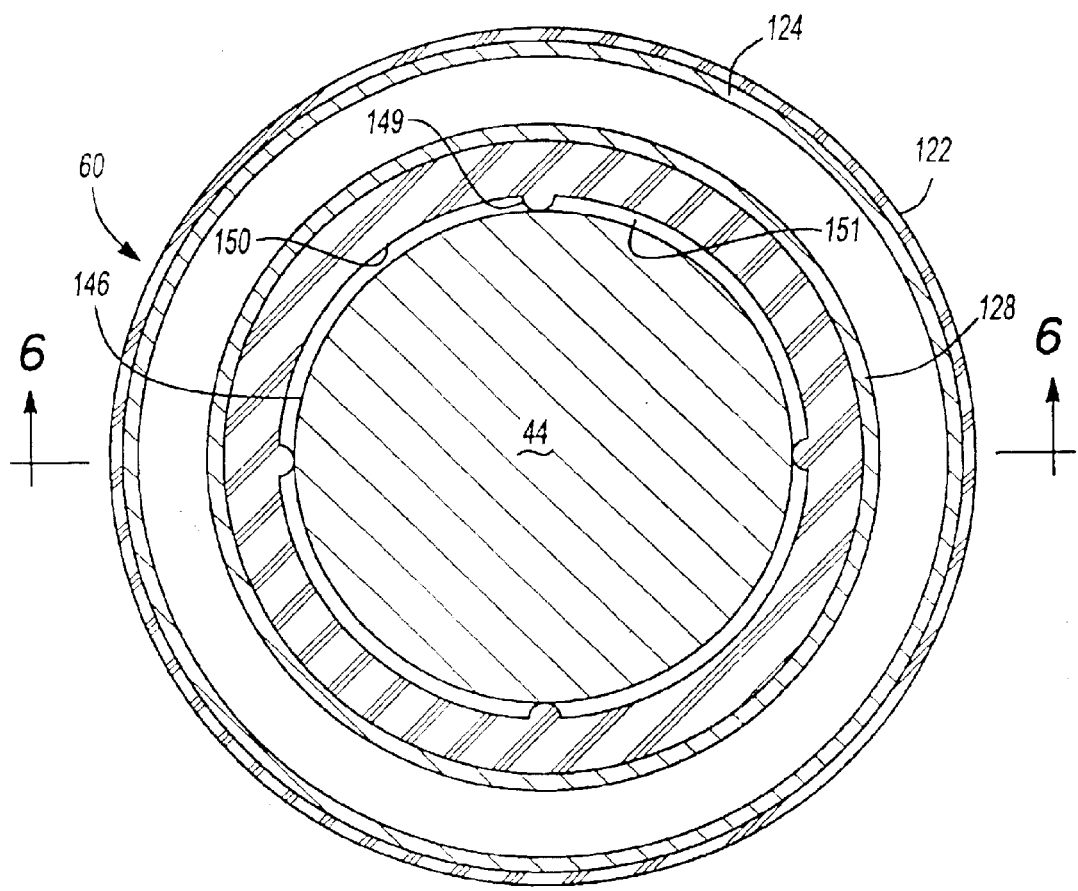
FIG. 5 is a partial cross-sectional view of the universal joint of FIG. 4 taken along line 5—5.
Figure 6:
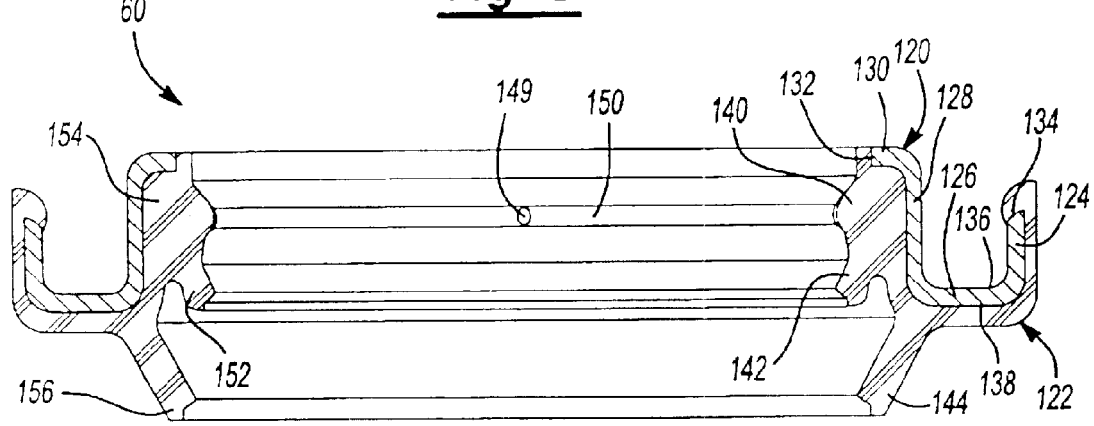
FIG. 6 is a cross-sectional view of the seal shown in FIG. 4.

FIGS. 4–6 depict seal 60 including a case 120 and an elastomer 122 bonded to case 120. Case 120 is preferably constructed from a mild steel. Elastomer 122 is preferably constructed from an injection moldable compound which is resilient and resistant to degradation from exposure to oil, grease, ozone or other commonly present compounds. Case 120 is a generally cup-shaped member formed from a steel sheet having a substantially constant thickness. Case 120 includes an outer wall 124, an end wall 126, an inner wall 128, and an inner flange 130. Inner flange 130 terminates at a first edge 132. Outer wall 124 terminates at a second edge 134. Case 120 includes an inner surface 136 extending from first edge 132 to second edge 134. An outer surface 138 is positioned on the opposite side of case 120 from inner surface 136 and also extends from first edge 132 to second edge 134. Elastomer 122 is bonded to outer surface 138 and extends from first edge 132 to second edge 134.

Elastomer 122 includes a first lip 140, a second lip 142 and a third lip 144. First lip 140 functions as a primary seal and engages trunnion 44 at a seal race portion 146. FIG. 4 depicts seal race portion 146 having a greater outer diameter than a bearing support portion 148. One skilled in the art will appreciate that seal race portion 146 may be sized and shaped identically as bearing support portion 148 without departing from the scope of the present invention. First lip 140 is sized to nominally interfere with seal race portion 146. Because elastomer 122 is constructed from a resilient material, first lip 140 biasedly engages seal race portion 146. A plurality of projections 149 extend radially inwardly from a contact surface 150 of first lip 140. Projections 149 are sized and shaped to cause localized openings 151 to be formed between contact surface 150 and seal race portion 146 of trunnion 44. The openings 151 between first lip 140 and seal race portion 146 form passages for trapped air and/or grease to escape during installation of bearing cup assembly 48. It should be appreciated that while projections 149 provide openings for the purging of trapped air and grease at initial installation, the projections are sized to wear rapidly. Once projections 149 wear, the openings 151 between contact surface 150 and seal race portion 146 close to provide a desirable seal between first lip 140 and seal race portion 146.

Second lip 142 is shaped as a wiper 152 extending from a body 154 of elastomer 122. Wiper 152 extends from body 154 at an angle such that pressurized air and grease within bearing cup 52 may escape once passed first lip 140. However, should second lip 142 provide a greater pressurizing function, wiper 152 may also be equipped with a plurality of projections (not shown) to provide local openings to assist in purging trapped air and grease.

Third lip 144 includes a wiper 156 radially inwardly extending from body 154. Wiper 152 and wiper 156 are constructed to biasedly engage seal race portion 146 once positioned on trunnion 44. As shown in FIG. 4, wiper 156 deflects from an unloaded position depicted in phantom line representation at 156' to the biasedly engaged position shown in solid line. Wiper 156 is cantilevered from body 154 such that pressure supplied to an inner face 158 causes wiper 156 to open or yawn and release the pressure to atmosphere. Once again, it should be appreciated that wiper 156 may be constructed to include a plurality of projections (not shown) to temporarily define openings to provide purging paths for trapped air and/or grease within bearing cup 52. The embodiment in FIG. 4 depicts case 120 engaging an outboard surface 160, an end surface 162 and wall surface 68 of bearing cup 52.

Figure 7:
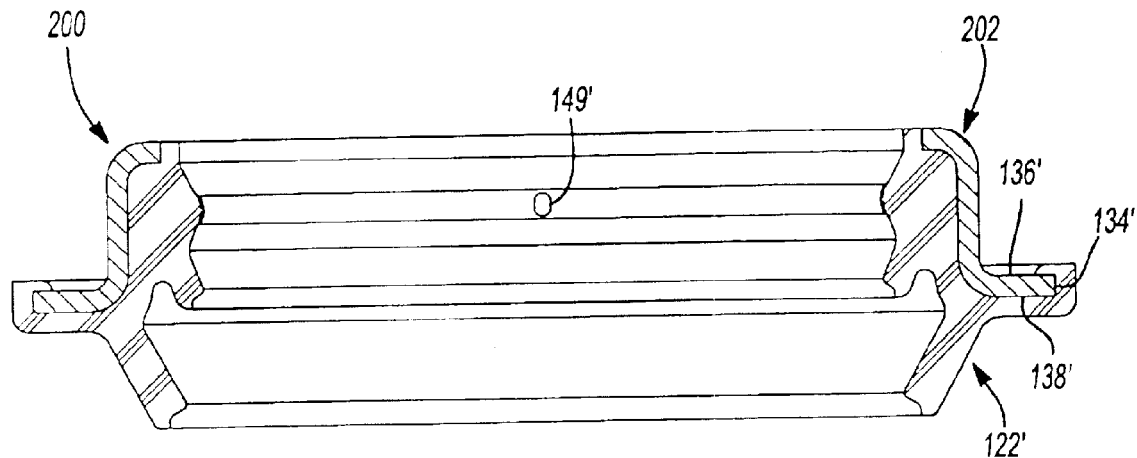
FIG. 7 is a cross-sectional side view of an alternate embodiment seal constructed in accordance with the teachings of the present invention.
Figure 8:
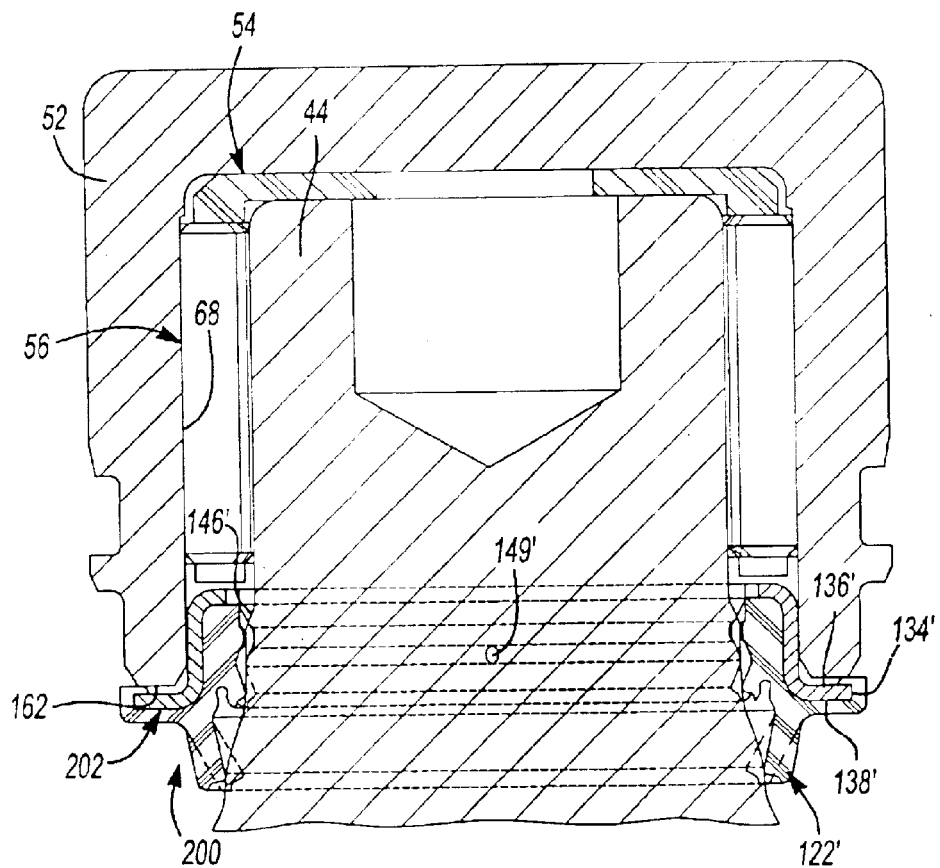
FIG. 8 is a partial cross-sectional side view of a universal joint including the seal depicted in FIG. 7.

FIGS. 7 and 8 depict an alternate embodiment seal 200. Seal 200 is substantially similar to seal 60. Accordingly, only the substantial differences will be described in detail hereinafter. Seal 200 includes a case 202 which engages inner wall surface 68 and end surface 162 of bearing cup 52. Case 202 is coupled to bearing cup 52 in a press-fit arrangement. Elastomer 122' is coupled to outer surface 138', second edge 134' and a portion of inner surface 136'. Seal 200 also includes a plurality of radially inwardly extending projections 149' locally engaging seal race portion 146'.

Figure 9:
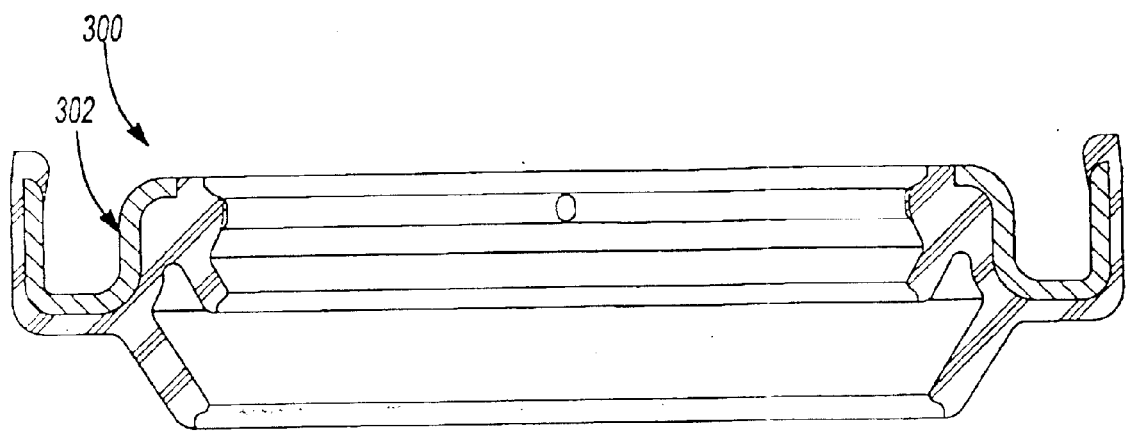
FIG. 9 is a cross-sectional side view of another alternate embodiment seal constructed in accordance with the teachings of the present invention.
Figure 10:
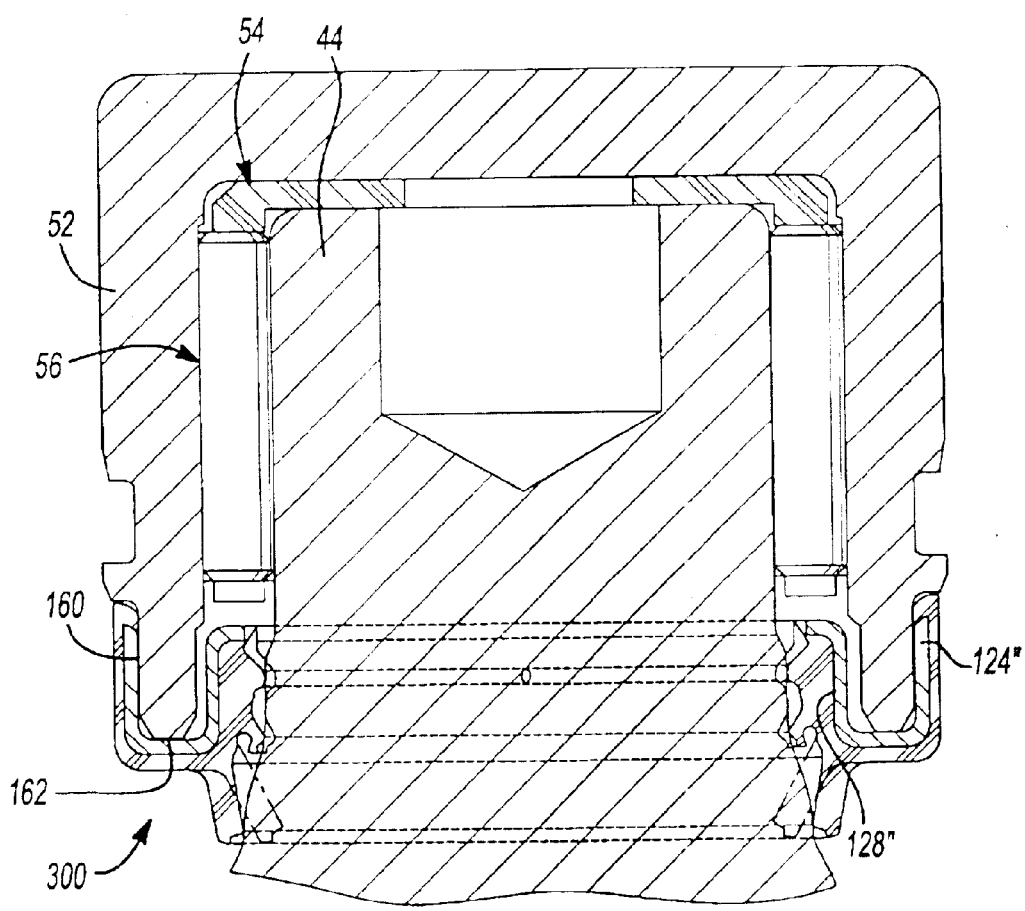
FIG. 10 is a partial cross-sectional side view of a universal joint including the seal of FIG. 9.

FIGS. 9 and 10 depict another alternate embodiment seal 300. Seal 300 includes a case 302 which engages outboard surface 160 and end surface 162 of bearing cup 52. Inner wall 128" of seal 300 is spaced apart from bearing cup 52. Outer wall 124" engages cup 52 in a press-fit arrangement to couple seal 300 to bearing cup 52.

Once bearing cup assemblies 48 and 50 are installed on trunnions 44 and 46, the bearing cup assemblies are inserted into leg apertures 28 and 38. Thereafter, cruciform 20 is centered, dynamically balanced and coupled to legs 22 and 32. A variety of methods for securing yokes 16 and 18 to cruciform 20 are available. One method includes mounting a snap ring 170 within a circumferential groove 172 formed on outer wall surface 66 of bearing cup 52. Snap ring 170 engages inboard surface 24 to retain the bearing assembly. Alternatively, portions of outboard surface 26 surrounding apertures 28 may be deformed using processes such as staking or peening to create local areas which engage outer end surface 70 of bearing cup 52. Another method involves injecting molten resin within a passageway extending between the leg and the bearing cup. The molten resin solidifies to retain the bearing cup within the aperture of the leg. Yet another retention method incorporates the use of projections (not shown) extending from legs 22 which may be deformed to engage a snap ring against outer end surface 70 of bearing cup 52. One or more of these methods is disclosed in commonly-owned U.S. Pat. Nos. 6,280,335, 6,162,126 and 6,336,868, the entire disclosure of each being hereby incorporated by reference.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A universal joint comprising:
   a yoke including a leg having an aperture extending therethrough;
   a cruciform having a trunnion;
   a bearing sup mounted on said trunnion, said bearing cup having a tubular segment positioned in said aperture; and
   a seal having a case and an elastomer mounted to said case, said case having an outer cylindrical surface engaging said tubular segment of said bearing cup, said elastomer including a plurality of annular lips engaging said trunnion, wherein one of said lips includes a plurality of inwardly extending protrusions, said protrusions engaging said trunnion to define a plurality of spaces between said one of said lips and said trunnion to allow the release of trapped air or grease.

2. The universal joint of claim 1 wherein said seal includes a first lip, a second lip and a third lip, said first lip being positioned closest to the distal end of said trunnion and including said plurality of inwardly extending protrusions.

3. The universal joint of claim 2 wherein said second lip is spaced apart from said first lip and shaped as a wiper being cantilevered from a body portion of said elastomer.

4. The universal joint of claim 3 wherein said third lip is axially spaced apart from said second lip and shaped as a wiper being cantilevered from said body portion of said elastomer.

5. The universal joint of claim 4 wherein said wipers are oriented to allow pressurized gas within said bearing cup to be released to the atmosphere.

6. The universal joint of claim 1 wherein said case includes an outer circumferential wall and an inner circumferential wall, each wall engaging a surface of said bearing cup.

7. The universal joint of claim 1 wherein at least two of said annular lips include a plurality of inwardly extending protrusions engaging said trunnion.

8. The universal joint of claim 1 further including a thrust washer positioned between an end surface of said trunnion and said bearing cup.

9. The universal joint of claim 1 wherein said case includes an outer circumferential wall and an inner circumferential wall, said outer circumferential wall engaging an outer surface of said bearing cup and wherein said inner circumferential wall of said case is spaced apart from an inner wall of said tubular segment of said bearing cup.

10. The universal joint of claim 1 wherein said case includes a circumferential wall engaging an inner circumferential surface of said tubular segment.

11. The universal joint of claim 1 wherein said case includes an inner face facing said bearing cup and an opposed outer face, wherein said elastomer extends substantially along the entirety of said outer face.

12. The universal joint of claim 1 wherein said case includes a radially extending flange engaging an end surface of said tubular segment of said bearing cup.

13. The universal joint of claim 1 wherein said case includes a radially inwardly extending flange positioned proximate to a bearing, said bearing rotatably supported on said trunnion and positioned within said bearing cup.

14. A method of assembling a universal joint comprising the steps of:
   mounting a seal to a bearing cup, said bearing cup including a tubular segment, said seal including a plurality of annular lips and a case having an outer cylindrical surfaced, wherein one of said lips includes a plurality inwardly extending protrusions and wherein said outer cylindrical surface engages said tubular segment;
   rotatably coupling said bearing cup to a trunnion of a cruciform;
   engaging said plurality of protrusions with said trunnion;
   defining a plurality of passageways between said trunnion and said one of said lips adjacent said plurality of protrusions;
   purging air trapped within said bearing cup to atmosphere by allowing said air to pass through said plurality of passageways; and
   coupling said bearing cup to a yoke.

15. The method of claim 14 further including engaging said plurality of lips with said trunnion.

16. The method of claim 15 wherein said plurality of annular lips includes a first lip, a second lip and a third lip, said first lip being positioned most proximate to a distal end of said trunnion and including said plurality of protrusions.

17. The method of claim 16 further including bending said second and third lips during said engaging said plurality of lips with said trunnion step.

18. The method of claim 14 wherein the step of mounting said seal to said bearing cup includes engaging a circumferential wall of said seal with an inner circumferential surface of said bearing cup.

19. The method of claim 18 further including engaging a second circumferential wall of said seal with an outer surface of said bearing cup.

20. The method of claim 14 wherein the step of mounting said seal to said bearing cup includes engaging a radially extending wall of said seal with an end face of said bearing cup.

21. The method of claim 14 further including positioning a thrust washer between an end face of said trunnion and said bearing cup.

* * * * *